United States Patent
Turnbull et al.

(10) Patent No.: US 12,457,250 B2
(45) Date of Patent: Oct. 28, 2025

(54) CONTENT DELIVERY

(71) Applicant: BRITISH TELECOMMUNICATIONS PUBLIC LIMITED COMPANY, London (GB)

(72) Inventors: Rory Turnbull, London (GB); Stephen Appleby, London (GB); Timothy Stevens, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 99 days.

(21) Appl. No.: 18/008,615

(22) PCT Filed: Jun. 9, 2021

(86) PCT No.: PCT/EP2021/065488
§ 371 (c)(1),
(2) Date: Dec. 6, 2022

(87) PCT Pub. No.: WO2021/250105
PCT Pub. Date: Dec. 16, 2021

(65) Prior Publication Data
US 2023/0254349 A1     Aug. 10, 2023

(30) Foreign Application Priority Data
Jun. 12, 2020   (GB) ..................... 2008945

(51) Int. Cl.
*H04L 65/1045*   (2022.01)
*H04L 65/611*    (2022.01)
*H04L 65/612*    (2022.01)

(52) U.S. Cl.
CPC ........ *H04L 65/1045* (2022.05); *H04L 65/611* (2022.05); *H04L 65/612* (2022.05)

(58) Field of Classification Search
CPC . H04L 65/1045; H04L 65/611; H04L 65/612; H04L 65/613; H04L 12/18; H04L 49/201; H04N 21/6405; H04N 21/6408
(Continued)

(56) References Cited

U.S. PATENT DOCUMENTS

2015/0288732 A1 * 10/2015 Phillips .............. H04N 21/6408
                                                    709/219
2016/0150255 A1    5/2016 Grinshpun et al.
(Continued)

FOREIGN PATENT DOCUMENTS

CN         105515983 A      4/2016
EP         2 785 006       10/2014
(Continued)

OTHER PUBLICATIONS

English translation of Office Action dated Jul. 24, 2025 issued for Chinese Application No. 202180085394.3 (Year: 2025).*
(Continued)

*Primary Examiner* — Tan Doan
(74) *Attorney, Agent, or Firm* — Nixon & Vanderhye P.C.

(57) ABSTRACT

A method of managing a network for delivering content to a client device, where content segments are delivered to a proxy in a multicast group, before delivery from the proxy to the client device over unicast. The proxy intermittently leaves the multicast group to probe the network by making unicast request for content segments, receiving those segments over unicast from the content server and forwarding those segments onto the client device. This allows the client device to determine the maximum throughput between the content server and the client device via the proxy, and thus the client device can use its adaptive bit rate algorithms to determine if the network can support a switch to a higher bit rate stream, and request a higher bit rate stream accordingly.

(Continued)

The higher bit rate stream can be serviced by the proxy joining or establishing a suitable multicast group.

14 Claims, 5 Drawing Sheets

(58) Field of Classification Search
USPC .......................................................... 709/231
See application file for complete search history.

(56) References Cited

U.S. PATENT DOCUMENTS

| | | | |
|---|---|---|---|
| 2018/0205802 A1* | 7/2018 | Bowen | ................ H04L 43/0894 |
| 2018/0343291 A1 | 11/2018 | Lohmar et al. | |
| 2020/0037012 A1* | 1/2020 | Nilsson | .................. H04N 21/84 |

FOREIGN PATENT DOCUMENTS

| | | |
|---|---|---|
| GB | 2583020 | 10/2020 |
| WO | 2016/209266 | 12/2016 |
| WO | 2021/063594 | 4/2021 |

OTHER PUBLICATIONS

"3rd Generation Partnership Project; Technical Specification Group Services and System Aspects; Multimedia Broadcast/Multicast Service (MBMS); Architecture and functional description (Release 16)", 3GPP TS 23.246 V16.1.0, Sep. 2019, 77 pages.
"IP Multicast Adaptive Bit Rate Architecture Technical Report", V01, Document Control No. OC-TR-IP-MULTI-ARCH-C01-161026, Oct. 26, 2016, 69 pages.
"Digital Video Broadcasting (DVB); Adaptive media streaming over IP multicast", DVB Document A176, Mar. 2018, 19 pages.
Combined Search and Examination Report for GB Application No. 2008945.4 dated Nov. 26, 2020, 6 pages.
International Search Report and Written Opinion of the ISA for PCT/EP2021/065488 dated Sep. 23, 2021, 11 pages.
International Preliminary Report on Patentability dated Jun. 13, 2023 issued for International Application No. PCT/EP2021/084263 (9 pages).
International Search Report and Written Opinion dated Mar. 17, 2022 issued for International Application No. PCT/EP2021/084263 (7 pages).
Combined Search and Examination Report dated Apr. 30, 2021 issued for GB Application No. GB2020129.9 (5 pages).
International Preliminary Report on Patentability dated Dec. 22, 2022 issued for International Application No. PCT/EP2021/065488 (8 pages).
Communication pursuant to Article 94(3) EPC dated Mar. 31, 2025, issued for European Application No. 21 830 632.2-1206 (9 pages).
Translation of Office Action dated Mar. 28, 2025 issued for Chinese Application No. 202180041658.5 (9 pages).
Office Action dated Jul. 24, 2025 issued for Chinese Application No. 202180085394.3 (5 pages).

* cited by examiner

CONTENT DELIVERY

CROSS-REFERENCE TO RELATED APPLICATIONS

This application is the U.S. national phase of International Application No. PCT/EP2021/065488 filed Jun. 9, 2021 which designated the U.S. and claims priority to GB 2008945.4 filed Jun. 12, 2020, the entire contents of each of which are hereby incorporated by reference.

FIELD OF THE INVENTION

This invention relates to the field of content delivery using a combination of unicast and multicast.

BACKGROUND TO THE INVENTION

Figure 1:
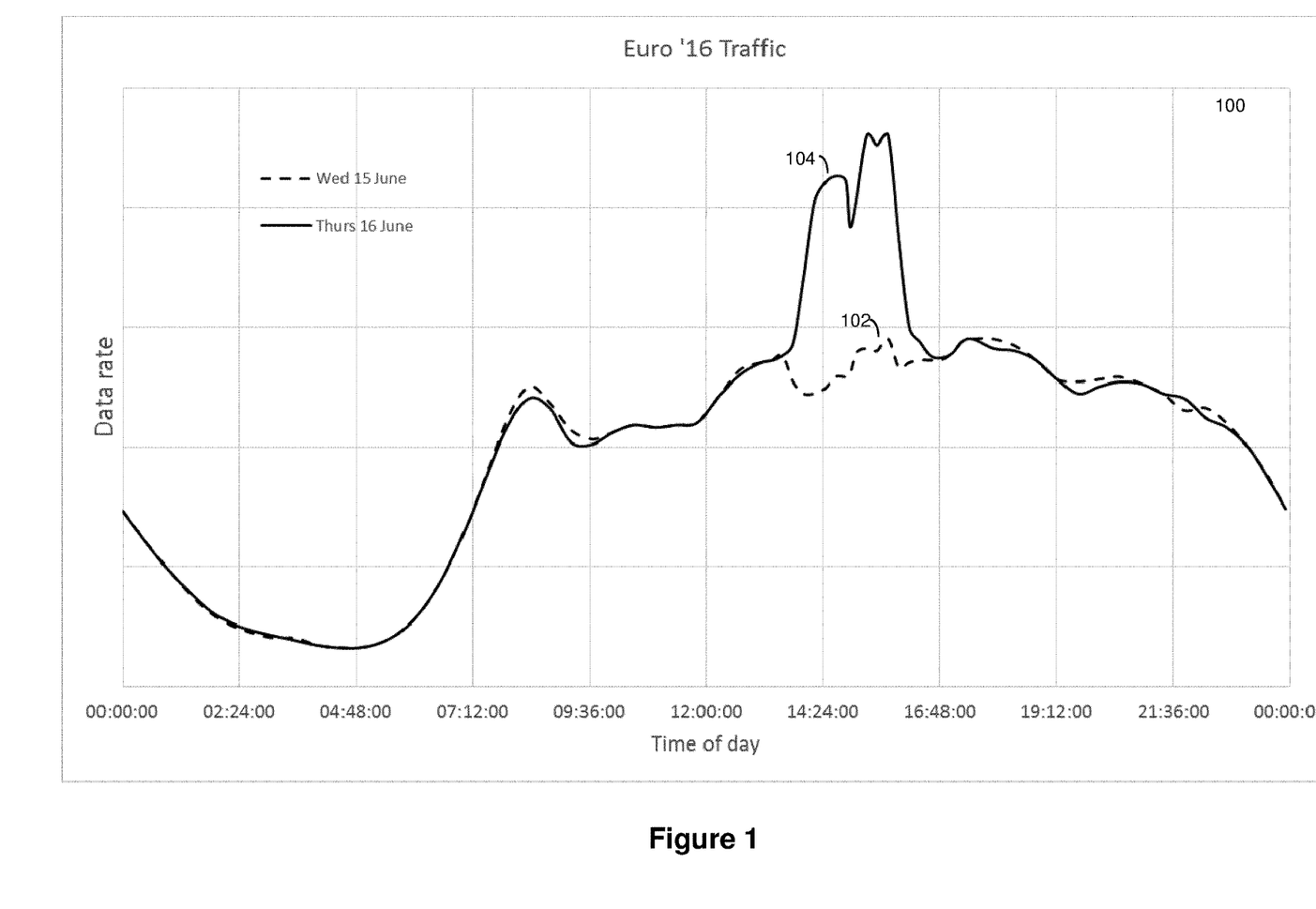
FIG. 1 is a graph showing traffic volume over a network on different days.

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed $15^{th}$ June) without football, and plot 104 shows the traffic volumes the following day (Thu $16^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such requests/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the available network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-C01-161026, 26 Oct. 2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8 Mar. 2018).

Figure 2:
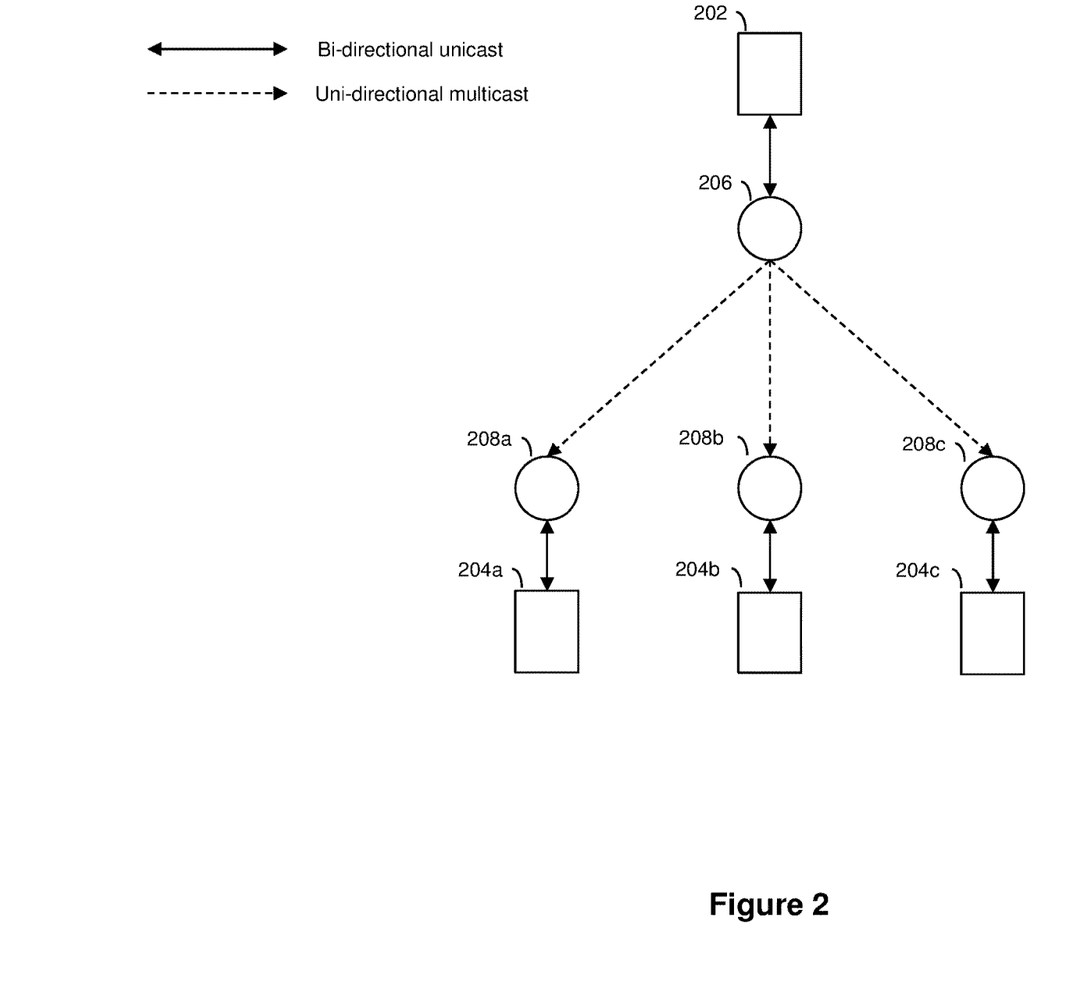
FIG. 2 is a network diagram of a general prior solutions.

FIG. 2 shows a generalised example of such solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as client, and independently makes requests for content segments and dispatches the entire response into the multicast network. Proxy X does this by first requesting a manifest file and then making timely requests for the content segments described within it.

In such arrangements, the rate at which Proxy Y makes content available to client devices is constrained by the multicast rate between Proxy X and Proxy Y, as well as other factors such as whether Proxy Y has cached any of the content in advance. Thus, a client device utilising HAS may have problems properly monitoring the available network throughput from the content server to the client device, which in turn prevents the client devices adaptive bitrate algorithms functioning properly and switching between video rates under HAS.

Other unicast-multicast hybrid arrangements suffer from similar problems.

SUMMARY OF THE INVENTION

It is the aim of examples of the present invention to provide an improved content delivery mechanism.

According to one example of the invention, there is provided a method of managing content delivery over a network to a client device, said content comprising a sequence of segments and wherein each of the segments is encoded at a plurality of bit rates, said method comprising:

receiving at a first network element one or more segments encoded at a first bit rate over multicast sent from a content server, and sending the plurality of segments encoded at the first bit rate from the first network element to the client device over unicast;

sending a request for one or more subsequent segments encoded at the first bit rate from the first network element to the content server over unicast;

receiving at the first network element the requested one or more subsequent segments over unicast, and forwarding the received subsequent segments to the client device over unicast;

receiving at the first network element from the client device a request for one or more further subsequent segments encoded at a second bit rate, wherein the second bit rate is higher than the first bit rate; and receiving at the first network element the requested one or more further subsequent segments over multicast, and sending the received further segments to the client device over unicast.

The requested one or more segments may be received at the first network element are sent by the content server.

After step iv), the method may include sending the request for one or more further subsequent segments encoded at a second bit rate to the content server over unicast.

The segments received at the first network element over multicast may be sent by a second network element.

The first network element may be a proxy server. The second network element may be a proxy server.

The content may be video content.

The first network element and client device may be co-located.

According to one example of the invention, there is provided a network element for managing content delivery over a network to a client device, said content comprising a sequence of segments and wherein each of the segments is encoded at a plurality of bit rates, said proxy server adapted in operation to:

receive one or more segments encoded at a first bit rate over multicast sent by a content server, and send the plurality of segments encoded at the first bit rate to the client device over unicast;

send a request for one or more subsequent segments encoded at the first bit rate to the content server over unicast;

receive the requested one or more subsequent segments over unicast, and forward the received subsequent segments to the client device over unicast;

receive from the client device a request for one or more further subsequent segments encoded at a second bit rate, wherein the second bit rate is higher than the first bit rate; and receive the requested one or more further subsequent segments over multicast, and sending the received further segments to the client device over unicast.

BRIEF DESCRIPTION OF THE DRAWINGS

For a better understanding of the present invention reference will now be made by way of example only to the accompanying drawings, in which.

DESCRIPTION OF PREFERRED
EMBODIMENTS

The present invention is described herein with reference to particular examples. The invention is not, however, limited to such examples.

Examples of the present invention provide a method of managing a network for delivering content to a client device, where content segments are delivered to a proxy in a multicast group, before delivery from the proxy to the client device over unicast. The proxy intermittently leaves the multicast group to probe the network by making unicast request for content segments, receiving those segments over unicast from the content server and forwarding those segments onto the client device. This allows the client device to determine the maximum throughput between the content server and the client device via the proxy, and thus the client device can use its adaptive bit rate algorithms to determine if the network can support a switch to a higher bit rate stream, and request a higher bit rate stream accordingly. The higher bit rate stream can be serviced by the proxy joining or establishing a suitable multicast group.

Figure 3:
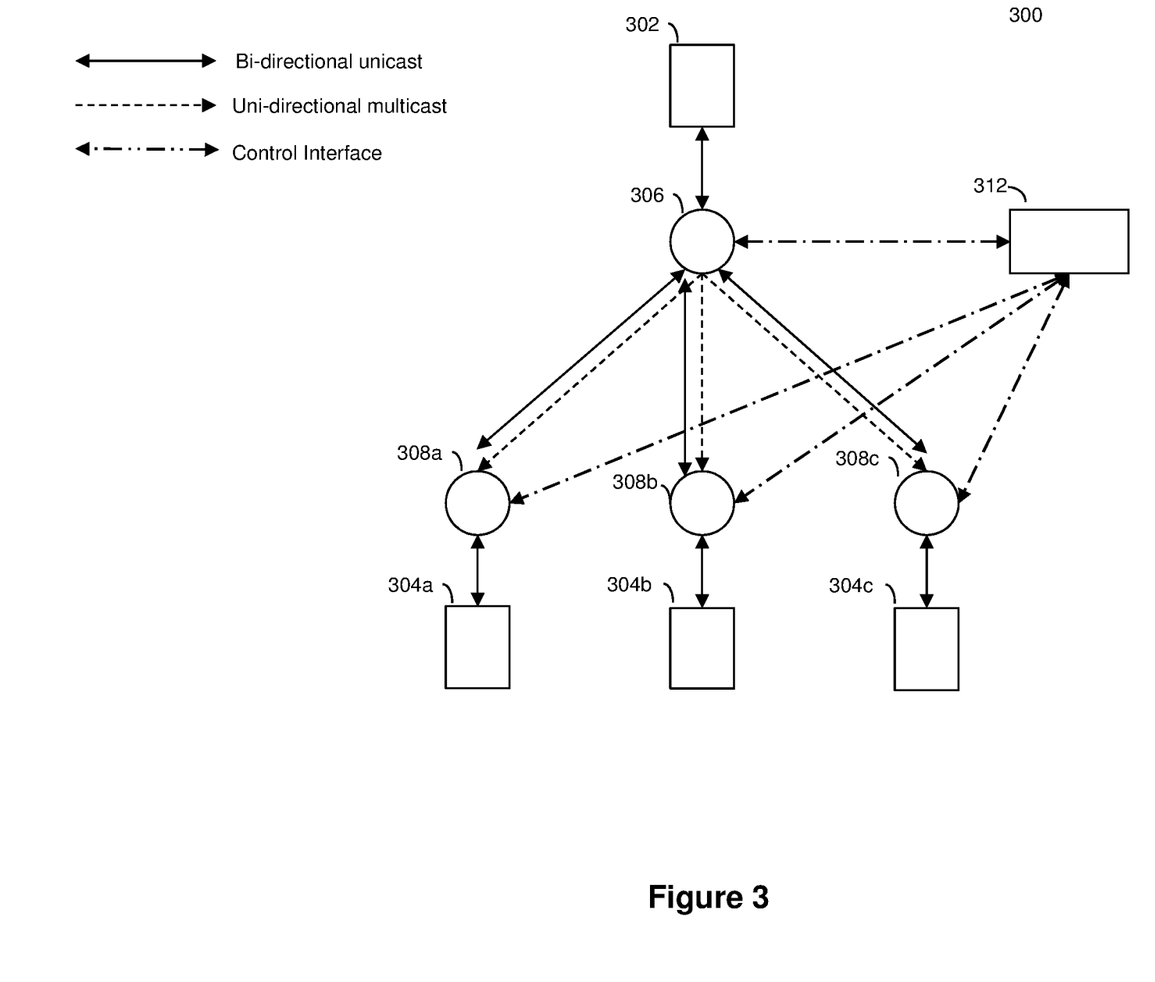
FIG. 3 is a network diagram showing the main components of an example of the present invention.

FIG. 3 shows the main components of a simplified "Multicast Assisted Unicast Delivery" (MAUD) network supporting content delivery. Examples of the present invention are applicable to a simplified MAUD network as described here. A person skilled in the art will also appreciate that the examples are equally applicable to other hybrid unicast/multicast delivery networks, such as the ones described above.

A more detailed MAUD arrangement is described in the Applicant's patent application EP19159748.3, which describes an arrangement referred to as "Multicast Assisted Unicast Delivery" (MAUD). Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. The separation and recombination are handled by suitably configured proxy servers. Examples of the present invention can be applied to such a MAUD arrangement, though the splitting and recombining of the requested content is not key to examples of the present invention.

Returning to FIG. 3, the network 300 comprises a content server 302, a Proxy X 306, Proxy Ys 308a, 308b, and 308c, client devices 304a, 304b and 304c, and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over both unicast and multicast. The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network. Other relevant communications paths will be described later.

The client devices are assumed to be running respective client applications, which are the source of content requests. For simplicity, the term client device from hereon in is used to refer to a client device running a client application. The client devices can make HTTP (or HTTPS) unicast requests for content held at the content server 302.

The content held at the content server 302 is typically media content (e.g. a TV programme, film or an entire linear TV channel) comprising video sequences encoded according a suitable standard such as the ITU H.264 standard. The video sequences are stored in the form of sequential temporal segments at the content server 302, where each segment is typically equivalent to 2 to 10 seconds of decoded video. The video sequences are also encoded at a plurality of bit rates or quality levels, resulting in a plurality of encoded sequences, each encoded at one of a plurality of bit rates. Such an arrangement is typical of an adaptive bit rate streaming service.

Manifest files are used by clients to identify where segments are located (by a URL in the manifest). Thus, a client device streams a video sequence by using the manifest to determine where to direct sequential unicast requests for each segment, at a particular bit rate, in turn as required. Such an arrangement is used in HTTP Adaptive Streaming technologies such as MPEG-DASH and Apple's HLS (HTTP Live Streaming).

The multicast controller 312 (MCC) monitors the operation of Proxy X and the Proxy Ys, and controls the proxies accordingly.

Some HTTP requests made by the client devices for content will not make full use of the MAUD arrangement, but instead requests may be sent directly to the content server. Other requests for content from a client device that may benefit from MAUD are redirected to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and Proxy Y to exist in different domains, which would often be the case.

Other mechanisms to insert Proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

Figure 4:
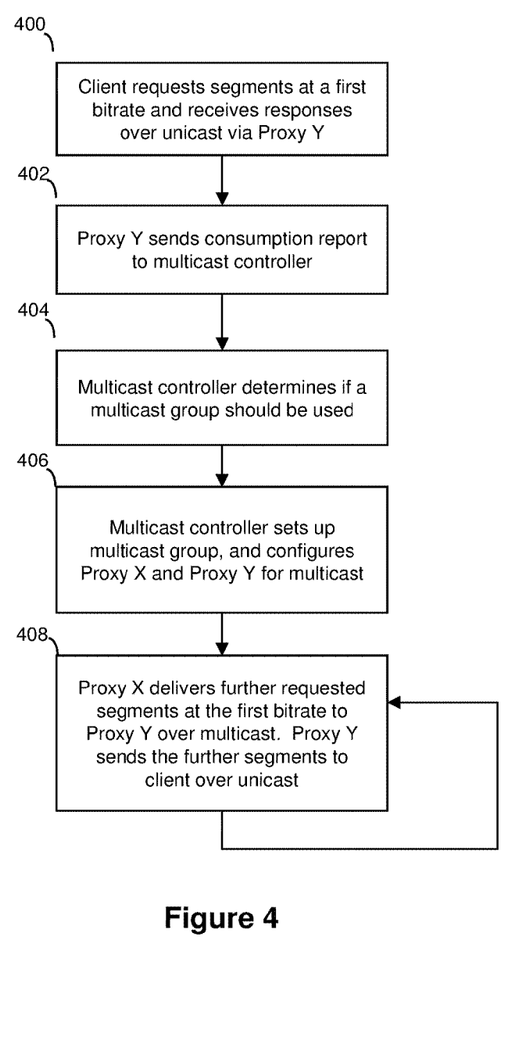
FIG. 4 is a flow chart summarising the steps of establishing a steady state multicast session in an example of the invention.

FIG. 4 shows a flow chart summarising the steps of establishing a multicast session for delivery of content to a client device.

Starting at step 400, one or more client devices make requests for segments of content, such as a film stored at the content server 302, and receives responses (the segments) over unicast via Proxy Y. For example, client device 304a makes HTTP GET requests, which are unicast in nature, directed to segments of content encoded at a particular bit rate. This initial or first bit rate may be chosen to be the lowest bit rate available, or the bit rate could be chosen some other way, such as based on historical data or user preference. Each HTTP GET request includes the URL of where that segment can be retrieved from. The URLs are found in the manifest file associated with the content. The requests are received by Proxy Y 308a, and forwarded to the content server 302.

The content server 302 responds with HTTP responses, each containing a requested segment. The HTTP responses are unicast responses. The responses are received by Proxy Y 308a and sent to the client device 304a. The received segments can then be viewed by the client device 304a.

The client device 304a could continue to request and receive segments according to step 400 until streaming of that content is complete. However, in examples of the invention, the multicast controller 312 determines whether a multicast group should be used to deliver subsequent segments.

In step 402, Proxy Y 308a sends a consumption report to the multicast controller 312, with data relating to the HTTP request/response pairs that are passing through the proxy e.g. the URL of each HTTP request. The consumption report can be sent to the multicast controller 312 at intervals— either a time interval or after a certain number of segments have been requested/received.

Now, the HTTP requests and response describes so far are all unicast in nature. However, it should be noted that requests for the same content might be made by other client devices. This is typical during for example a live football match. Proxy Y 308a and other Proxy Ys (308b or 308c) as appropriate send consumption reports to the multicast controller 312 for their respective client devices, so that the multicast controller 312 can determine whether or not to use multicast to help deliver further content.

In step 404, the multicast controller 312 uses the received reports to determine whether the HTTP requests reported from a given population of Proxy Ys justifies the use of multicast for their responses. Such a population of Proxy Ys is referred to as a 'cohort'. Assuming certain conditions are satisfied (for example, greater than a certain number of client devices requesting the same content at a similar time), the multicast controller 312 will configure Proxy X and any relevant Proxy Ys (that is the cohort) for multicast assisted delivery by setting up a suitable multicast group. Once the multicast group has been set up, content (requested segments) are sent to Proxy Y from Proxy X using multicast.

In step 406, the multicast controller 312 can add Proxy Y 308a to a cohort by sending Proxy Y 308a instructions to set up an HTTP request route, whereby requests matching a particular URL path/pattern/string are directed to Proxy X 306. The multicast controller 312 also sends Proxy Y 308a instructions to provision a multicast listener. The instructions tell Proxy Y 308a to prepare to receive multicast. The multicast listener causes Proxy Y to issue an IGMP join command to a multicast address specified by the multicast controller.

To allow the Proxy X 306 to use multicast for the return path for responses to requests that meet the match pattern set up for Proxy Y 306, the multicast controller 312 configures Proxy X 306 to use multicast for certain responses sent by the content server. For example, the instruction could be to only use multicast assistance for responses that contain video files or MIME types such as "video/mp4" or "video/MP2T", so that only responses containing video traffic are sent over multicast. In an alternative example, responses can be selected based on specific Etags or a range of Etags. Etags (Entity Tags) are part of the HTTP 1.1 specification and are used to uniquely identify response payloads.

Proxy X 306 and one or more of the Proxy Ys are now configured for respectively sending and receiving content over multicast.

In step 408, HTTP GET requests are sent by client device 304a over unicast and received at Proxy Y 308a for further segments encoded at the first bit rate. Proxy Y 308a checks to see if the requests match the pattern set out earlier. A match effectively means that the response to the request is to be delivered over multicast. In this example, it is assumed there is a match, and Proxy Y 308a sends the HTTP GET requests onto Proxy X 306 (instead of to the content server 302 directly).

Proxy X 306 sends the received HTTP GET requests to the content server 302, which responds with the requested segments (encoded at the first bit rate) in HTTP responses to Proxy X 306. Proxy X 306 then sends these segments over multicast. These segments are typically sent at a transmission rate that is sufficient to ensure timely delivery.

Proxy Y 308a is configured to receive multicast, and thus will receive the segments sent over multicast from Proxy X 306. The received segments are then sent over unicast from Proxy Y 308a to the client device 304a.

Step 408 repeats until the client device 304a stops requesting segments.

The flow chart of FIG. 4 represents establishing a steady state multicast session for content delivery, whereby content segments are requested by a client device, and delivered over multicast to a proxy (Proxy Y), before being sent over unicast from the proxy to the client device. However, the rate at which the client device 304a receives segments from Proxy Y 308a will be limited by the multicast rate between Proxy X and Proxy Y. The Applicants' patent application EP 19194759.7 sets out a method for setting a potential multicast rate.

However, having the multicast rate fixed means that the client device 304a can never truly determine the maximum throughput between the content server and the client device 304a. Consequently, the client device 304a cannot properly determine whether the network can support a higher bit rate stream of segments using its adaptive bit rate algorithms, and thus cannot accurately determine whether requests for segments encoded at a higher bit rate could be delivered in a timely manner for decoding.

Figure 5:
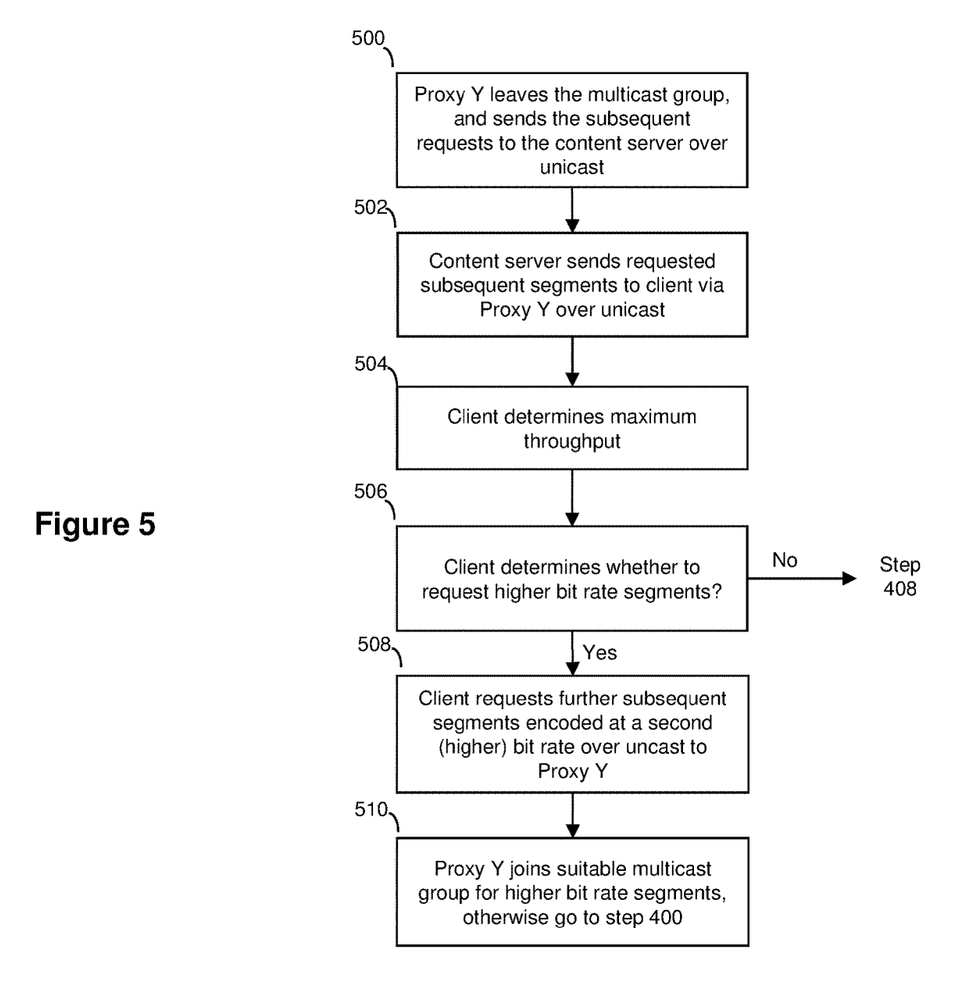
FIG. 5 is a flow chart summarising the steps of making a unicast probe in an example of the invention.

FIG. 5 shows a flow chart summarising the steps of an example of the present invention, whereby Proxy Y 302 probes the network in a manner that allows the client device 304a to determine the maximum throughput between the content server and the client device via Proxy Y. The client device 304a can then use its adaptive bit rate algorithms to determine if the network can support a switch to a higher bit rate stream, and request a higher bit rate stream accordingly. The processing in FIG. 5 follows on from the processing in FIG. 4.

Thus, it is assumed that a steady state is reached where step 408 is being processed, and the client device 304a continues to request subsequent segments of content encoded at the first bit rate over multicast. Step 500 of FIG. 5 follows from this steady state.

In step 500, Proxy Y 308a will from time to time (for example, after a period of time of after n-segment requests) leave the multicast group established in step 406. Proxy Y 308a also sends received HTTP GET requests from the client device for subsequent segments encoded at the first bit rate to the content server over unicast. The subsequent segments being the segments following the segments requested and delivered in step 408. These requests can go directly to the content server 302.

In step 502, the content server 302 responds by sending the requested subsequent segments to Proxy Y 308a over unicast. Proxy Y 308a forwards these segments directly to the client device 304a without any delay over unicast. As such, the delivery of the subsequent segments is over unicast, and will be delivered as quickly as the network between the content server 302 and the client device 304a, via Proxy Y 308a, will allow. The client device 304a can therefore assess the maximum throughput from the content server 302 to the client device 304a, rather than the multicast limited rate to Proxy Y 308a had the client device 304a only received segments over multicast.

Steps 500 and 502 can be viewed as a unicast probe of the maximum throughput between the client device 304a and the content server 302.

Thus, in step 504, the client device 304a determines this maximum throughput from the rate at which the subsequent segments are received, which can be calculated as the total segment size divided by the time over which the segment is received.

In step 506, the client device 304a determines if segments encoded at a higher bit rate (higher than the first bit rate) can be timely delivered based on the determined maximum throughput. This is done by the client using its ABR algorithm. Typically, the ABR algorithm will take into account the maximum throughput and the bit rate of the encoded segments.

If the client device 304a decides not to switch to segments encoded at a higher bit rate, then processing returns to step 408 and segments continue to be received over multicast without a switch to a higher bit rate. If the decision is yes, then processing passes to step 508.

In step 508, the client device 304a makes a request for a further subsequent segment, but now the segment being requested is one that is encoded at a higher bit rate, that is higher than the first bit rate. This request for a higher bit rate encoded segment is sent over unicast to Proxy Y 308a.

In step 510, Proxy Y 308a can service this request for a segment encoded at a higher bit rate in a number of ways. If there is an existing multicast group carrying the higher bit rate stream, then Proxy Y 304a can join that group. Proxy Y 304a will then receive the requested segment encoded at the higher bit rate over multicast from the content server, and send it onto the client device 304a over unicast, as described in step 408.

However, if there is not a suitable multicast group, processing can pass back to step 400, where the request is initially serviced over unicast, but at some later point a suitable multicast group can be established to deliver the segments encoded at a higher bit rate over multicast to Proxy Y 308a.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery over a network to a client device, said content comprising a sequence of segments and wherein each of the segments is encoded at a plurality of bit rates, said method comprising:
   i) receiving at a first network element one or more segments encoded at a first bit rate over multicast sent from a content server, and sending the plurality of segments encoded at the first bit rate from the first network element to the client device over unicast;
   ii) sending a request for one or more subsequent segments encoded at the first bit rate from the first network element to the content server over unicast;

iii) receiving at the first network element the requested one or more subsequent segments over unicast, and forwarding the received subsequent segments to the client device over unicast;

iv) receiving at the first network element from the client device a request for one or more further subsequent segments encoded at a second bit rate, wherein the second bit rate is higher than the first bit rate;

v) sending the received request for one or more further subsequent segments encoded at the second bit rate from the first network element to the content server over unicast; and vi) receiving at the first network element the requested one or more further subsequent segments over multicast, and sending the received further segments to the client device over unicast.

2. The method according to claim 1, wherein the requested one or more further subsequent segments received at the first network element are sent by the content server.

3. The method according to claim 1, wherein segments received at the first network element over multicast are sent via a second network element.

4. The method according to claim 3, wherein the second network element is a proxy server.

5. The method according to claim 1, wherein the first network element is a proxy server.

6. The method according to claim 1, wherein the content is video content.

7. The method according to claim 1, wherein the first network element and client device are co-located.

8. A network element for managing content delivery over a network to a client device, said content comprising a sequence of segments and wherein each of the segments is encoded at a plurality of bit rates, said network element comprising a hardware processor at least configured to:

receive one or more segments encoded at a first bit rate over multicast sent by a content server, and send the plurality of segments encoded at the first bit rate to the client device over unicast;

send a request for one or more subsequent segments encoded at the first bit rate to the content server over unicast;

receive the requested one or more subsequent segments over unicast, and forward the received subsequent segments to the client device over unicast;

receive from the client device a request for one or more further subsequent segments encoded at a second bit rate, wherein the second bit rate is higher than the first bit rate;

send the received request for one or more further subsequent segments encoded at the second bit rate to the content server over unicast; and receive the requested one or more further subsequent segments over multicast, and sending the received further segments to the client device over unicast.

9. The network element according to claim 8, wherein the network element is configured to receive the requested one or more further subsequent segments which are sent by the content server.

10. The network element according to claim 8, wherein the network element is configured to receive segments over multicast which are sent via a second network element.

11. The network element according to claim 10, wherein the second network element is a proxy server.

12. The network element according to claim 8, wherein the network element is a proxy server.

13. The network element according to claim 8, wherein the content is video content.

14. The network element according to claim 8, wherein the network element is located within a client device.

* * * * *